(12) United States Patent
Hartmann

(10) Patent No.: US 7,334,722 B1
(45) Date of Patent: Feb. 26, 2008

(54) SCAN-ON-READ

(75) Inventor: Al Hartmann, Round Rock, TX (US)

(73) Assignee: Symantec Corporation, Cupertino, CA (US)

( * ) Notice: Subject to any disclaimer, the term of this patent is extended or adjusted under 35 U.S.C. 154(b) by 497 days.

(21) Appl. No.: 11/057,532

(22) Filed: Feb. 14, 2005

(51) Int. Cl.
*G07F 17/00* (2006.01)

(52) U.S. Cl. ...................... 235/375; 235/380

(58) Field of Classification Search ........... 235/375, 235/380; 713/200; 726/24
See application file for complete search history.

(56) References Cited

U.S. PATENT DOCUMENTS

| | | | |
|---|---|---|---|
| 4,776,537 A | 10/1988 | Garside et al. |
| 4,888,798 A | 12/1989 | Earnest |
| 5,050,212 A | 9/1991 | Dyson |
| 5,103,476 A | 4/1992 | Waite et al. |
| 5,182,770 A | 1/1993 | Medveczky et al. |
| 5,432,851 A | 7/1995 | Scheidt et al. |
| 5,450,576 A | 9/1995 | Kennedy |
| 5,530,757 A | 6/1996 | Krawczyk |
| 5,548,532 A | 8/1996 | Menand et al. |
| 5,564,054 A | 10/1996 | Bramnick et al. |
| 5,596,711 A | 1/1997 | Burckhartt et al. |
| 5,606,609 A | 2/1997 | Houser et al. |
| 5,625,693 A | 4/1997 | Rohatgi et al. |
| 5,661,848 A | 8/1997 | Bonke et al. |
| 5,708,776 A | 1/1998 | Kikinis |
| 5,765,151 A | 6/1998 | Senator |
| 5,799,088 A | 8/1998 | Raike |
| 5,802,080 A | 9/1998 | Westby |
| 5,854,759 A | 12/1998 | Kaliski, Jr. et al. |
| 5,922,072 A | 7/1999 | Hutchinson et al. |
| 5,956,475 A | 9/1999 | Burckhartt et al. |
| 5,974,546 A | 10/1999 | Anderson |
| 6,000,032 A | 12/1999 | Millard |
| 6,014,744 A | 1/2000 | McKaughan et al. |
| 6,014,767 A | 1/2000 | Glaise |
| 6,048,090 A | 4/2000 | Zook |
| 6,061,788 A | 5/2000 | Reynaud et al. |
| 6,079,016 A | 6/2000 | Park |
| 6,088,803 A | 7/2000 | Tso et al. |
| 2005/0149749 A1* | 7/2005 | Van Brabant ............ 713/200 |

(Continued)

FOREIGN PATENT DOCUMENTS

EP    0858031 A1    8/1998

(Continued)

OTHER PUBLICATIONS

Richter, J., Microsoft.com web pages (online). "Design a Windows NT Service to Exploit Special Operating System Facilities", Oct. 1997 (retrieved Aug. 29, 2003). Retrieved from the Internet: <URL: http://www.microsoft.com/msj/1097/winnt.aspx.

(Continued)

*Primary Examiner*—Karl D. Frech
(74) *Attorney, Agent, or Firm*—Fenwick & West LLP

(57) ABSTRACT

A scan-on-read manager efficiently scans received data. The scan-on-read manager detects attempts by applications to read received data. The scan-on-read manager scans received data only responsive to an application attempting to read it. The scan-on-read manager only allows the application to read received data that has been scanned.

15 Claims, 2 Drawing Sheets

U.S. PATENT DOCUMENTS

2006/0037079 A1* 2/2006 Midgley ..................... 726/24

FOREIGN PATENT DOCUMENTS

| WO | WO 93/25024 A1 | 12/1993 |
| WO | WO 95/15522 A1 | 6/1995 |
| WO | WO 95/22794 A1 | 8/1995 |

OTHER PUBLICATIONS

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

MacNamra, John E., "Technical Aspects of Data Communication", 2ed. 1982, Digital Equipment Corporation, U.S.A. pp. 110-122.

Ore, Oystein, "Number Theory and Its History", 1976 Gudron Ore, U.S.A. pp. 124-129.

Schneier, Bruce, "Applied Cryptography", 2ed. 1996, Bruce Schneier, U.S.A. pp. 436-441.

Nair, et al., "A Symbol Based Algorithm for Hardware Implementation of Cycle Redundancy Check", IEEE, 1997.

"PC Medic 97 User's Guide", McAfee Associates, Inc., issued Mar. 1997, pp. 1-60.

"Norton Utilities for Windows User's Guide—Version 2.0", Symantec, 1995.

* cited by examiner

SCAN-ON-READ

TECHNICAL FIELD

This invention pertains generally to computer security scanning, and more specifically to minimizing the security scanning performance penalty for hardware transport network interfaces.

BACKGROUND

Transport Control Protocol Offload Engines (TOEs) and related hardware transport mechanisms are becoming more widely used, and are likely to ultimately displace conventional software transport stacks. Hardware transport can support very efficient and highly scalable network communications. More specifically, hardware transport avoids both the kernel intervention and intermediate buffer copying required by software transport. Kernel intervention and the associated processor context switching require significant computing resources and time. Thus, the avoidance of kernel intervention during transport makes for more efficient network communication. Intermediate buffer copying and its associated memory bandwidth consumption are also resource and time intensive, and eliminating them during transport results in additional efficiency.

The performance gain from kernel bypass and zero copy mechanisms offered by hardware transport is estimated at approximately four times (4×). This is because a receive operation with hardware transport only passes the data once over the system memory interface, i.e. 1×, transferring data directly from the wire to the application buffer. With a conventional intermediate copy through kernel buffers, the data is transferred three times over the system memory interface, i.e. 3× (write, read, write). The elimination of the additional kernel mode context switches, cache faults, and cache coherence traffic result in the additional performance gain.

Although far more efficient, hardware transport creates a problem for receive-side security scanning (e.g., malicious code scanning of received data). Accessing received data for security scanning before allowing the target application to read the data substantially diminishes or eliminates the 4× performance advantage of hardware transport over software transport. Because it is impossible to perform software-based security scans without at least reading the data, some performance penalty is unavoidable. However, it would be highly desirable to retain as much of the performance gain provided by hardware transport as possible, and still be able to scan received data.

A solution to a separate problem in the area of parallel processing is of interest. Parallel processing is a technique to gain a performance advantage by forking multiple processes to perform computational activities in parallel. A common related operation is the creation by a process of a child process that is a memory clone of the parent. In a naive implementation, this requires the complete memory space of the parent process to be copied to a new memory area for the child process. This is a very expensive operation that would negate much of the performance advantage of parallel processing. To minimize the amount of copying required, to delay the copying until absolutely necessary, and to stagger the copying operations in time (so they didn't monopolize the memory interface), a clever solution termed "copy-on-write" was devised.

Copy-on-write is a technique that allows the two processes to share the single memory space of the parent as much as possible by only copying data to a separate memory area for the child process when one of the processes is to write to that data. Because typically the majority of the data is never updated by either process, the two processes can share a single copy. Two copies are needed only for the data modified by the parent or child.

In the customary implementation, copy-on-write alters the virtual memory system page table entries so that either the parent or child process attempting to write a page will fault to a handler that first copies the page so that the child process has its own local copy. After this local copy is created, the page table entries are reset to permit write operations on the page. The copy-on-write mechanism is known to those of skill in the art of systems programming, and is documented, for example, in *Operating System Concepts* by Silberschatz, Galvin and Gagne (John Wiley & Sons, 2003) pp 328-29.

What is needed are computer implemented methods, computer readable media and computer systems for minimizing the security scanning performance penalty for hardware transport network interfaces by allowing as much data as possible to be copied directly into the target application buffer, while still allowing access to received data for scanning as desired.

DISCLOSURE OF INVENTION

Computer-implemented methods, computer systems and computer-readable media efficiently scan received data. A scan-on-read manager detects attempts by applications to read received data. The scan-on-read manager scans received data only responsive to an application attempting to read it. The scan-on-read manager only allows the application to read received data that has been scanned.

In one embodiment, the scan-on-read manager modifies at least one page table entry for an application receive buffer to cause a fault in response to the application attempting to read an associated page. Then, responsive to the fault caused by the application attempting to read the associated page, fault handling functionality in the scan-on-read manager detects the attempt by the application to read the received data. Responsive to the application attempting to read the page of data, the scan-on-read manager scans at least that page.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
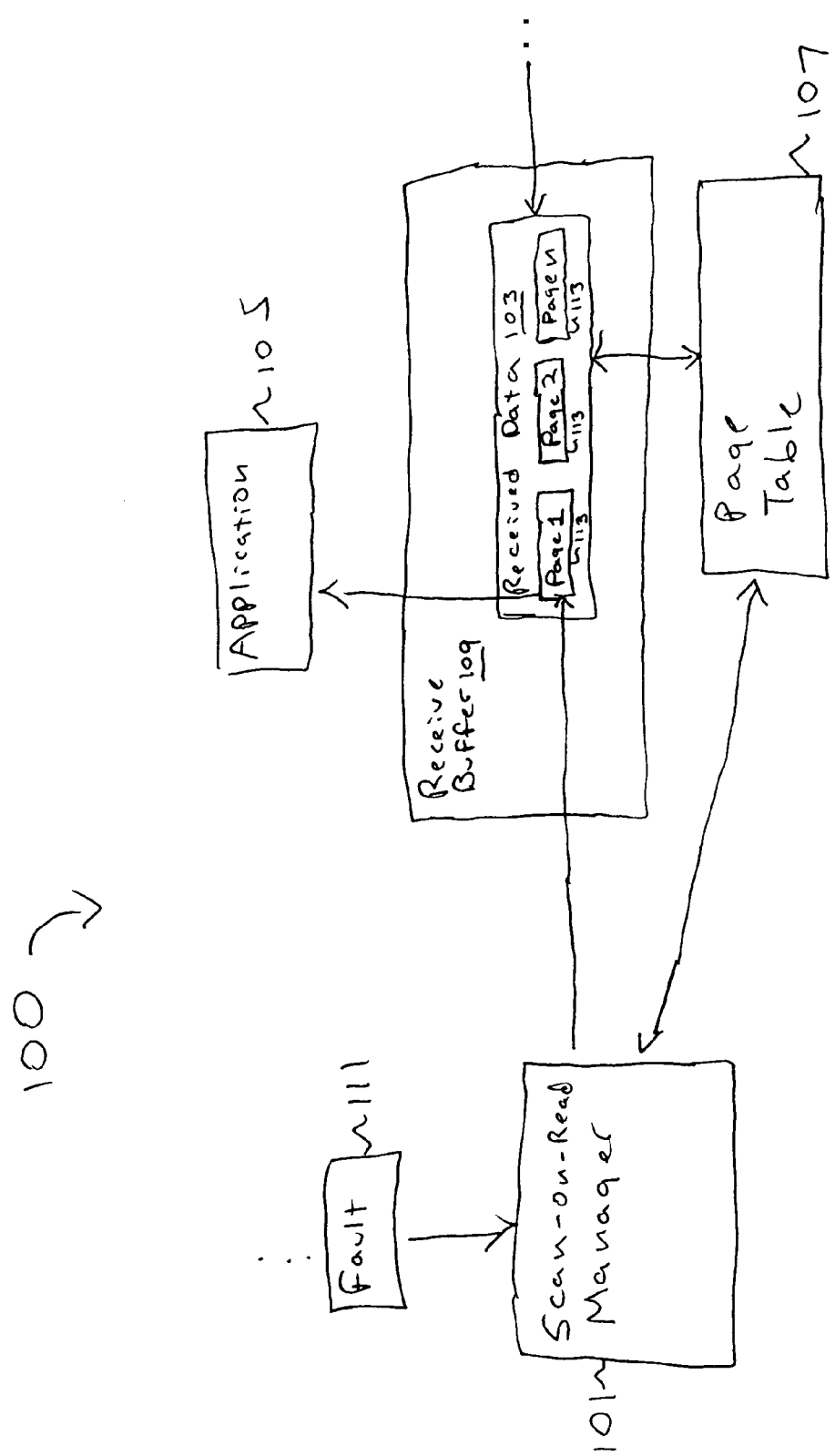
FIG. 1 is a block diagram, illustrating a high level overview of a system for efficiently scanning received data according to some embodiments of the present invention.

FIG. 1 illustrates a high level overview of a system 100 for practicing some embodiments of the present invention. A scan-on-read manager 101 efficiently scans received data 103. It is to be understood that although the scan-on-read manager 101 is illustrated as a single entity, as the term is used herein a scan-on-read manager 101 refers to a collection of functionalities which can be implemented as software, hardware, firmware or any combination of these. Where a scan-on-read manager 101 is implemented as software, it can be implemented as a standalone program, but can also be implemented in other ways, for example as part of a larger program, as a plurality of separate programs, as one or more device drivers or as one or more statically or dynamically linked libraries.

It is to be further understood that in various embodiments a scan-on-read manager 101 can be instantiated on and/or as part of a server, client, firewall, intrusion detection system, proxy, gateway, switch and/or any combination of these and/or other computing devices and/or platforms.

As illustrated in FIG. 1, the scan-on-read manager 101 detects attempts by applications 105 to read received data 103, and in response scans the received data 103 that the application 105 is attempting to read. The scan-on-read manager 101 allows the application 105 to read only received data 103 that has been scanned.

More specifically, in one embodiment of the present invention, in order to detect attempts by applications 105 to read received data 103, the scan-on-read manager 101 can modify page table entries 107 for application receive buffers 109, so as to cause a fault 111 in response to an application 105 attempting to read an associated memory page 113. When an application 105 attempts to read a memory page 113, a fault 111 is generated which is processed by fault handling functionality within the scan-on-read manager 101. The scan-on-read manager 101 thus detects that the specific application 105 is attempting to read the specific page 113 of received data 103. Fault handling is known to those of ordinary skill in the relevant art, and the implementation mechanics of its use within the context of the present invention will be apparent to those so skilled in light of this specification.

Figure 2:
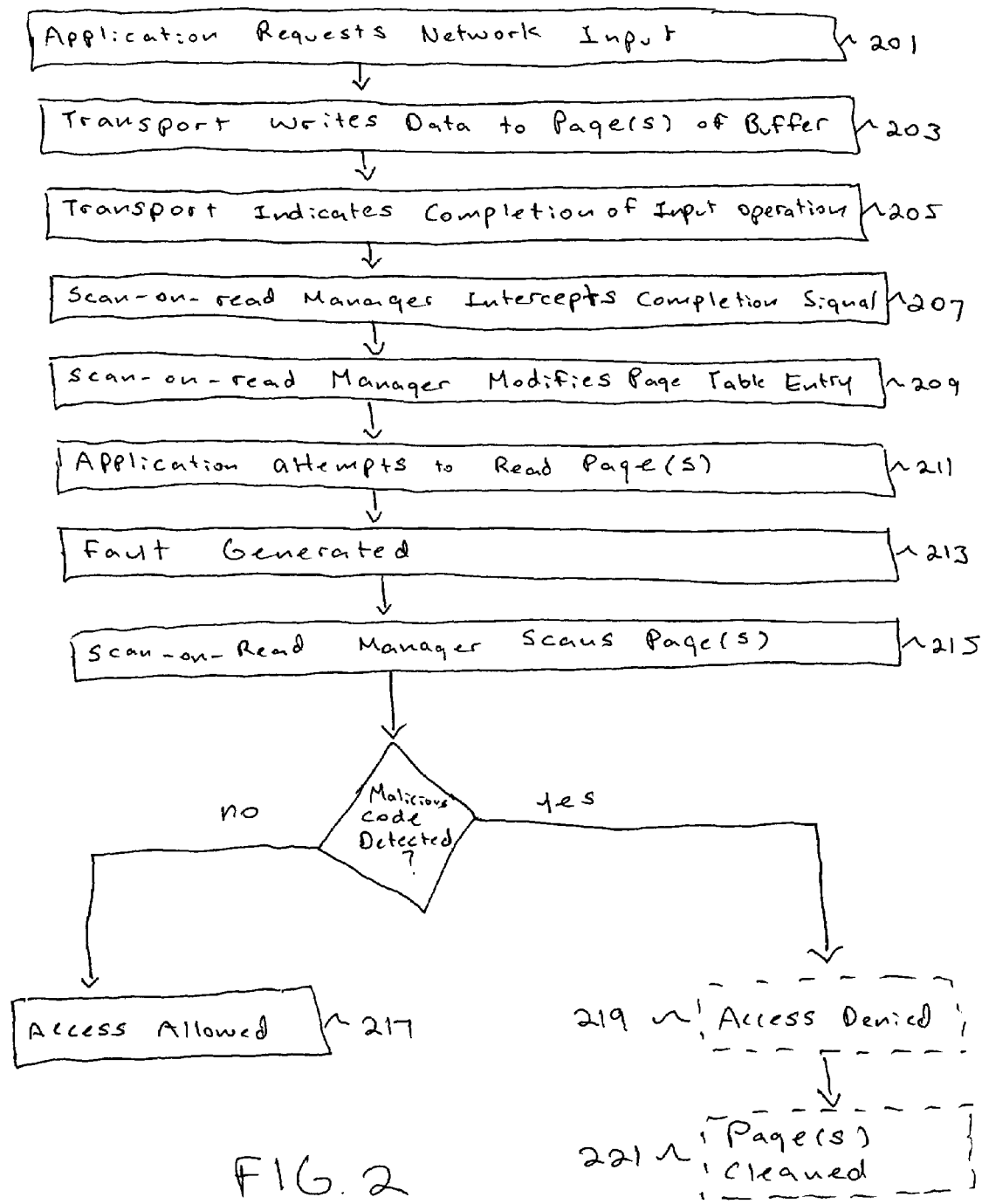
FIG. 2 is a flowchart illustrating steps for efficiently scanning received data according to some embodiments of the present invention.

As illustrated in FIG. 2, in one embodiment of the present invention, modifying a page table entry 107 to cause a fault 111 in response to an application 105 attempting to read the associated page 113 comprises invalidating 209 the page table entry 107. Thus, when the application 105 attempts 211 to read the associated page 113, a fault 111 will be generated 213.

More specifically, the application 105 requests 201 network input into one or more page(s) 113 of the application input buffer 109. Note that in current practice, applications 105 (and their input libraries) are designed to refrain from accessing the input buffer 109 until after it has been filled by the transport, at which point the transport signals 205 completion of the input operation. Typically, the application 105 either synchronously blocks until the input operation is finished, or the application 105 receives an asynchronous signal or event notifying it of the completion of the input operation.

Responsive to the request from the application, the transport writes 203 the data 103 into the page(s) 113 of the buffer 109, and signals 205 completion of the operation. Note that at this point the associated page table entries 107 allow write access, so that the transport can write 203 the data 103 to the page(s) 113.

The scan-on-read manager 101 intercepts 207 the signal/event indicating completion of the network input operation, and modifies 209 the page table entries 113 so as to generate 213 a fault 111 when (and if) the associated pages 113 are subsequently accessed 211 by the application 105. The completion event is then forwarded to the application 105 (or the application 105 is unblocked). Note that at this point the application 105 assumes the input operation is completed, and that the data 103 can be accessed from the buffer 109. The application 109 later attempts 211 to access buffer pages 113, triggering 213 a memory access fault 111 as described above.

Responsive to the fault 111 (i.e., responsive to the application 105 attempting 211 to read the page(s) 113), the scan-on-read manager 101 scans 215 the associated page(s) 113. In some instances, the scan-on-read manager 101 also scans 215 logically contiguous pages 113 to check for scan patterns that might overlap page boundaries.

As noted above, the scan-on-read manager 101 allows 217 applications 105 to read only received data 103 that has been scanned. More specifically, after scanning 215 received data 103 that an application 105 has attempted to read, the scan-on-read manager 101 can execute an appropriate step based on the results of the scanning. For example, if the scanning does not detect malicious code in the received data 103, the scan-on-read manager 101 can allow 217 the application 103 to read that data 103. On the other hand, if the scanning does detect malicious code, the scan-on-read manager 101 can prevent 219 the application 105 from reading the data 103, or can clean 221 the malicious code from the data 103 and only then permit access.

Returning to FIG. 1, in one embodiment of the present invention, the scan-on-read manager 101 allows an application 105 to read a page 113 of received data 103 that has been scanned by modifying the associated page table entry 107 to permit at least read operations (e.g., to permit read, or to permit read/write, etc.). In this embodiment, the scan-on-read manager 101 can prevent an application 105 from reading a page 113 of received data 103 by leaving the associated page table entry 107 invalidated. Modifying page table entries 107 (e.g., invalidating, modifying to permit read access, etc.) is known to those of ordinary skill in the relevant art, and the implementation mechanics thereof within the context of the present invention will be apparent to those so skilled in light of this specification.

As explained herein, the present invention innovatively adapts the earlier copy-on-write performance problem solution into a new form called scan-on-read. This new solution provides the same performance advantages as copy-on-write (i.e., memory access minimization, lazy access (delayed till necessary) and access staggering) by allowing as much data as possible to be copied directly into the target application buffer, while still allowing access to received data for scanning as desired.

As will be understood by those familiar with the art, the invention may be embodied in other specific forms without departing from the spirit or essential characteristics thereof. Likewise, the particular naming and division of the modules, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for efficiently scanning received data, the method comprising the steps of:
    detecting attempts by at least one application to read received data, wherein detecting an attempt by an application to read received data comprises:
        modifying at least one page table entry for an application receive buffer to cause a fault in response to the application attempting to read an associated page; and
        responsive to a fault caused by the application attempting to read the associated page, detecting the attempt by the application to read the received data;
    only responsive to an application attempting to read received data, scanning the received data that the application is attempting to read; and
    allowing the application to read only received data that has been scanned.

2. The method of claim 1 wherein modifying at least one page table entry for an application receive buffer to cause a fault in response to the application attempting to read the associated page comprises:
    invalidating the at least one page table entry.

3. The method of claim 1 wherein scanning the received data that the application is attempting to read responsive to an application attempting to read received data comprises:
    responsive to the application attempting to read a page of data in the application receive buffer, scanning at least that page.

4. The method of claim 3 further comprising:
    scanning at least one additional contiguous page for a target pattern suspected of overlapping at least one page boundary.

5. The method of claim 1 further comprising:
    prior to modifying the at least one page table entry, determining that the received data has been written to the receive buffer.

6. The method of claim 5 wherein determining that the received data has been written to the receive buffer further comprises:
    intercepting a signal generated by a network transport indicating completion of a requested input operation.

7. A computer readable medium containing a computer program product for efficiently scanning received data, the computer program product comprising:
    program code for detecting attempts by at least one application to read received data, wherein the program code for detecting an attempt by an application to read received data comprises:
        program code for modifying at least one page table entry for an application receive buffer to cause a fault in response to the application attempting to read an associated page; and
        program code for, responsive to a fault caused by the application attempting to read the associated page, detecting the attempt by the application to read the received data;
    program code for, only responsive to an application attempting to read received data, scanning the received data that the application is attempting to read; and
    program code for allowing the application to read only received data that has been scanned.

8. The computer program product of claim 7 wherein the program code for modifying at least one page table entry for an application receive buffer to cause a fault in response to the application attempting to read the associated page comprises:
    program code for invalidating the at least one page table entry.

9. The computer program product of claim 7 wherein the program code for scanning the received data that the application is attempting to read responsive to an application attempting to read received data comprises:
    program code for, responsive to the application attempting to read a page of data in the application receive buffer, scanning at least that page.

10. The computer program product of claim 9 further comprising:
    program code for scanning at least one additional contiguous page for a target pattern suspected of overlapping at least one page boundary.

11. The computer program product of claim 7 further comprising:
    program code for determining that the received data has been written to the receive buffer prior to modifying the at least one page table entry.

12. A computer system for efficiently scanning received data, the computer system comprising:
    a software portion configured to detect attempts by at least one application to read received data, wherein the software portion configured to detect an attempt by an application to read received data comprises:
- a software portion configured to modify at least one page table entry for an application receive buffer to cause a fault in response to the application attempting to read an associated page; and
- a software portion configured to detect the attempt by the application to read the received data, responsive to a fault caused by the application attempting to read the associated page a software portion configured to scan received data that an application is attempting to read, only responsive to the application attempting to read received data; and a software portion configured to allow the application to read only received data that has been scanned.

13. The computer system of claim 12 wherein the software portion configured to modify at least one page table entry for an application receive buffer to cause a fault in response to the application attempting to read the associated page comprises:
a software portion configured to invalidate the at least one page table entry.

14. The computer system of claim 12 wherein the software portion configured to scan the received data that the application is attempting to read responsive to an application attempting to read received data comprises:
a software portion configured to scan at least a page, responsive to the application attempting to read that page of data in the application receive buffer.

15. The computer system of claim 12 further comprising:
a software portion configured to determine that the received data has been written to the receive buffer.

* * * * *